Patented June 6, 1944

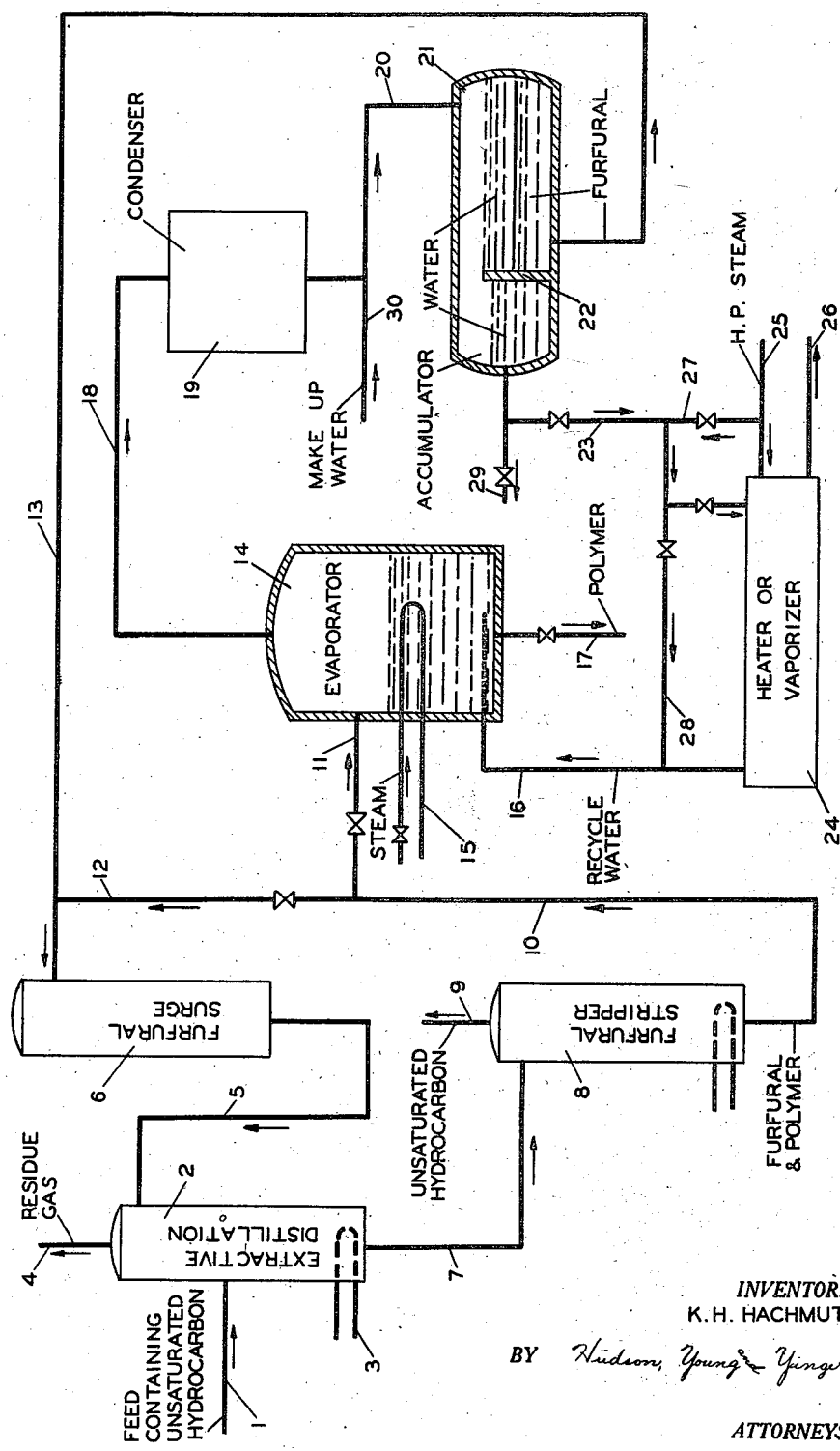

2,350,609

UNITED STATES PATENT OFFICE 2,350,609

FURFURAL PURIFICATION

Karl H. Hachmuth, Bartlesville, Okla., assignor to Phillips Petroleum Company, a corporation of Delaware Application February 15, 1943, Serial No. 475,959

6 Claims. (Cl. 196—13)

This invention relates to furfural purification and more particularly to the treatment of furfural which has been employed as a selective solvent in the extraction or concentration of unsaturated hydrocarbons from hydrocarbon streams containing the same, especially of aliphatic mono-olefins and aliphatic conjugated diolefins particularly butylenes and butadiene from respective streams containing the same, whereby the furfural has become contaminated with polymer. This polymer comprises largely or consists essentially of polymerized furfural. Apparently its formation takes place under the influence of heat, pressure, moisture, hydrocarbons especially olefins or diolefins, air or oxygen, and other conditions and components present or encountered in the absorption and stripping zones. The concentration of this polymer in the furfural continually increases with time of use until finally it is so high that it becomes imperative to shut down the plant for cleaning or withdrawal and discard of the furfural. Accumulation of this polymer is objectionable for a number of reasons. The polymer coats surfaces of the equipment interfering with heat transfer, causing coking on heating coils or elements, plugging and other difficulties. Also the polymer reduces the selectivity of the solvent.

The principal object of the present invention is to provide a method of treating furfural contaminated with polymer in the manner above described in order to remove the polymer and recover pure furfural for recycle to the solvent extraction system. Another object is to effect such purification by steam distillation. Another object is to prevent the loss of furfural from the purification system. Still another object is to provide a purification process of the foregoing type which allows continuous operation of the mono-olefin or diolefin extraction and stripping units. Numerous other objects will more fully hereinafter appear.

The accompanying drawing portrays more or less diagrammatically one arrangement of equipment which has been found particularly suitable for carrying out the process of the present invention. The evaporator and the condensate accumulator and separator are shown in cross-section.

In accordance with the present invention, polymer-free furfural is recovered from the furfural which has been employed as a selective solvent in the extraction of aliphatic unsaturated hydrocarbons, specifically olefins or conjugated diolefins and thereby contaminated with the polymer, by a series of steps involving steam distilling the polymer-containing furfural whereby an overhead vapor is formed which comprises polymer-free furfural and water. The polymer, being non-volatile even under the conditions of steam distillation is left behind in the bottom of the distilling zone where it may be withdrawn continuously or allowed to accumulate.

The overhead vapors from the steam distilling step are condensed whereupon the liquid condensate is allowed to undergo layer formation. The upper layer of water containing dissolved furfural is withdrawn and recycled as such or after heating or after vaporization, to the steam distilling step and thereby utilized as the source of steam for carrying out this step. This prevents loss of valuable furfural from the system dissolved in the water which would otherwise be discarded.

The lower layer is composed of polymer-free furfural and is recycled to the extraction system for re-use therein.

By proceeding in the manner just outlined, effective and efficient recovery of polymer-free furfural is accomplished with a minimum of loss of furfural from the system and the objectionable polymer is removed from the system.

In a preferred mode of operation, the steps of extracting the unsaturated hydrocarbon and of stripping the rich furfural are carried out continuously. Either a part or all, as desired, of the lean stripped furfural is passed to the furfural recovery system for removal of polymer, and any balance is passed directly, without purification, to the extraction unit. The recovery or purification unit may, however, conveniently be operated batchwise, the polymer being allowed to accumulate in the bottom of the steam distilling zone or evaporator during the entire time that the lean furfural is being fed thereto. Periodically, when the accumulation of polymer justifies, but prior to accumulation of polymer in an excessive or objectionable amount, the feed of the lean furfural to the distilling zone is cut off but the operations of steam distillation, condensation of overhead, layer formation and separation and withdrawal and recycle of water and furfural layers are continued just as before, until most if not all of the furfural has been removed from the accumulated polymer, desirably until the mixture in the bottom of the distilling zone contains at least 90% by weight of polymer. Thereupon the polymer is withdrawn from the distilling zone in any suitable way, and the lean furfural feed and steam distilling steps are resumed as before.

The steam for the steam distillation may be made in the steam distilling zone itself by providing heating elements such as an indirect coil in contact with the liquid phase therein, and feeding the recycled water layer into the bottom of the steam distillation zone whereby the recycled water is converted to steam which carries over the polymer-free furfural in accordance with well-known principles. If desired, the recycle water may be heated prior to its introduction in this manner.

Alternatively or in addition to heating by an indirect heating element in the bottom of the distilling zone itself, the recycled water containing dissolved furfural may be vaporized in an intermediate vaporizing zone, and the resulting steam introduced directly into the steam distilling zone.

Referring to the drawing, the hydrocarbon feed containing the unsaturated hydrocarbon to be concentrated, say a $C_4$ feed containing normal butane or butadiene, enters extractive distillation unit 2 via line 1. The operation of unit 2 is fully described in my copending applications, Serial No. 454,312 filed August 10, 1942, and Serial No. 438,844 filed April 13, 1942. For purposes of the present description, it may be stated that this operation combines extraction with fractional distillation in a fractionating column 2, the furfural being supplied continuously via line 5 from tank 6 to the top of the column and descending therein, and the hydrocarbon feed being vaporized upwardly countercurrently to the furfural, a reboiling arrangement 3 being provided at the bottom of the column. The residue gas leaves via line 4.

The rich furfural passes via line 7 to stripping column 8 where the unsaturated hydrocarbon is driven off via line 9. The stripped lean furfural leaves via line 10 whence a portion or all may be passed via line 11 to the re-run unit. Any balance is passed via line 12 for recycle via line 13 and storage tank 6.

The re-run unit embodies an evaporator 14 provided with a kettle heating element 15 shown as a coil heated indirectly by steam. Coil 15 is preferably located sufficiently above the bottom of evaporator 14 to allow accumulation of a very substantial amount of liquid in the kettle below the heating element, say 70 gallons in an evaporator three feet in diameter and six feet high. The purpose of this is to insure that in the periodic polymer concentration step, hereinafter described, the polymer layer will not touch the heating element as in so doing it would cause coking on its surface.

In order to provide steam in the evaporator 14, water or steam, as desired, is fed into the kettle by means of line 16 the end of which may be perforated as indicated by the dotted line so as to disperse the incoming water or steam throughout the kettle liquid.

A polymer draw-off line 17 is provided as shown, but as indicated herein, it is ordinarily not preferred to draw off polymer continuously as this would entail undue loss of free furfural in admixture therewith. On the contrary, it is preferable to draw off the polymer intermittently or periodically, allowing it to accumulate in the bottom of still 14 for a considerable period of time and then shutting off flow of feed in line 11 to the re-run unit, "cooking down" the polymer, that is, steam distilling most or all of the free furfural therefrom, then draining off the polymer and resuming feed flow in line 11.

The overhead vapors from evaporator 14, and usually consisting essentially of polymer-free furfural and water (although some butadiene dimer, 4-vinyl cyclohexene-1, may be present in small amounts), leave via line 18 and are condensed in condenser 19. The liquid condensate passes via line 20 to accumulator-separator 21 into which it flows on the right-hand side of overflow dam or partition 22. In the separating compartment thus formed by weir 22, layer separation takes place continuously, the water forming the upper layer and continuously overflowing over the weir into the left-hand compartment whence it is continuously removed via line 23 and the furfural layer continuously being withdrawn via line 13 and recycled to furfural surge tank 6.

The water layer made up of water saturated with furfural may be passed via line 23 through heater or vaporizer 24 where it may be heated or converted to steam by means of high pressure steam entering via line 25 and leaving via line 26. If desired, a small amount of steam may be fed into the recycle water stream by means of line 27 or makeup water may be added in any other desired manner as by means of line 30. Also if desired, element 24 may be partially or completely by-passed by means of line 28. The recycle water phase, whether steam or liquid water or both, is fed into steam distilling zone 14 by means of line 16. Water may be removed from the re-run system by means of line 29 if desired.

*Example 1*

The re-run unit described above was operated as follows over a period of 172 hours. The following table gives an average hourly material balance during this operation. The figures in the first four columns are pounds per hour.

| Identity of stream | Weight of stream | Composition of stream | | | Temp. °F. of stream |
| --- | --- | --- | --- | --- | --- |
| | | Furfural | Water | Polymer | |
| Feed (line 11) | 256.0 | 244.1 | 10.0 | 1.9 | 290 |
| Overhead vapor | 913.1 | 283.0 | 630.0 | 0.1 | 204 |
| Polymer product [1] | 2.0 | 0.1 | 0.1 | 1.8 | 203 |
| Furfural product | 260.1 | 244.0 | 16.0 | 0.1 | 100 |
| Water recycle | 659.1 | 39.0 | 620.1 | 0 | 100 |
| Make-up water | 6.1 | | 6.1 | | |

[1] Drawn off intermittently (in this case only at end of run).

All external heat was supplied by the kettle element 15, using high pressure steam. The recycle water vaporizer 24 was not used. The unit was operated at atmospheric pressure.

A small amount of water was carried overhead in the furfural absorber 2 and in the furfural stripper 8. Consequently, make-up water was added at the re-run unit, as indicated in the table, by means of line 30.

Two liquid layers existed in the evaporator 14 almost continuously throughout the observed 172-hour period. The top layer was water saturated with furfural. The lower layer was furfural and polymer with varying amounts of water. This was dark brown to black in color and was opaque.

At the end of the 172-hour period, the polymer in the evaporator was concentrated and removed from the system as follows. Furfural feed via line 11 was stopped and with the kettle element 15 still supplying all heat, the evaporation and water recycle operation was continued just as before. After operating in this manner for 20 hours, the concentration of furfural in the overhead vapor had dropped from its normal value of 31 weight per cent to 13 weight per cent. This indicated that the water layer in the evaporator was not any longer saturated with furfural and that the polymer layer contained only a small quantity of furfural. Forty-two gallons of very viscous black material were then drawn off via line 17. This material analyzed 93 weight per cent of polymer.

The polymer content of the furfural in the absorber-stripper system at the start and finish of the 172-hour period was 0.7 and 0.33 weight per cent, respectively. With 2500 gallons of furfural in the system, the polymer reduction amounted to 87 pounds. Total polymer removed during the 172-hour run was 400 pounds. Therefore, 313 pounds of polymer were formed in 172 hours, or 1.82 pounds per hour. The rate of furfural feed to the absorber was 1200 gallons per hour. Therefore, during the run, the polymer formation rate was .0165 weight per cent of the furfural rate to the furfural absorber.

*Example 2*

The re-run unit was operated as in Example 1 except that all heat was supplied by means of the high pressure steam vaporizer 24, kettle heating element 15 not being used. The water recycle stream, after passing through the vaporizer 24, had a temperature of 270° F.

While results were very satisfactory, it is preferred to use kettle heating element 15 in conjunction with vaporizer 24, the supply of steam to coil 15 being automatically controlled by a liquid-vapor interfacial lever controller applied to evaporator 14 for the purpose of actuating a throttling valve on the steam line to coil 15. Thus the vaporizer 24 may be employed to furnish most of the required heating and the coil 15 to supply any balance. This mode of operation results in a lower skin temperature at the kettle heating element coils and reduces coke formation on these coils.

The process of the present invention can be operated either under moderate pressures or under a vacuum as desired. However, it will usually be desirable to operate at atmospheric or a slight positive pressure to prevent the entry of air into the system. The presence of air (oxygen) promotes furfural polymerization and so is objectionable.

This application is a continuation-in-part of my prior and copending application, Serial No. 460,874 filed October 5, 1942.

I claim:

1. The process of recovering polymer-free furfural from stripped lean furfural which has been employed as a selective solvent in the extraction of aliphatic unsaturated hydrocarbons from hydrocarbon mixtures containing the same and has thereby become contaminated with polymer, which comprises steam distilling said polymer-contaminated furfural and thereby driving overhead vapors of polymer-free furfural and water and forming a residual bottom product of polymer, removing said overhead vapors of polymer-free furfural and water, condensing said overhead vapors, causing the liquid condensate to form into an upper layer of water containing dissolved furfural and a lower layer of polymer-free furfural, withdrawing said lower layer of polymer-free furfural for recycle to the extraction system, withdrawing said upper layer of water containing dissolved furfural, and employing said water containing dissolved furfural as the source of steam for said steam distilling step.

2. A process for the separation of aliphatic unsaturated hydrocarbons comprising extracting said hydrocarbon from a stream containing the same by means of furfural in an absorption zone, introducing the furfural rich in said hydrocarbon to a stripping zone and there stripping said hydrocarbon, withdrawing lean furfural from said stripping zone, said lean furfural being contaminated with polymer during said extracting and stripping steps, steam distilling at least a portion of said lean furfural, removing overhead vapors of polymer-free furfural and water and leaving the polymer behind, condensing said overhead vapors, causing the liquid condensate to form into an upper layer of water containing dissolved furfural and a lower layer of polymer-free furfural, withdrawing said polymer-free furfural and recycling same to said extracting step, withdrawing said water containing dissolved furfural, and recycling said water containing dissolved furfural and vaporizing same as the source of steam for said steam distilling step.

3. The process of claim 2 in which said extracting and stripping steps are carried out continuously, and said steam distilling step is carried out batchwise, and additionally including the steps of allowing the polymer to accumulate in the bottom of the steam distilling zone while the polymer-containing lean furfural is being fed thereto, periodically discontinuing said feed while continuing to carry out steam distillation of the polymer-furfural mixture in the bottom of the distillation zone, condensation of overhead, layer separation, and water and furfural withdrawal and recycle steps, until the mixture in said bottom contains at least 90% by weight of polymer, and then withdrawing said bottom mixture from said distilling zone and resuming said feed to said steam distilling zone and steam distilling said feed as before.

4. The process of claim 1 in which said recycled water containing furfural is vaporized in a separate zone apart from said steam distilling zone and the resulting steam is introduced directly into said steam distilling zone as the steam for said steam distilling step.

5. The process of claim 1 in which heat is supplied to said steam distilling zone by circulating a heat carrying medium in indirect heat exchange with the liquid in said zone and said recycled water containing dissolved furfural is supplied in liquid phase to said zone and is vaporized thereby.

6. The process of claim 1 in which heat is supplied to said steam distilling zone both by vaporization of said recycled water containing furfural in a separate zone and direct introduction of the resulting steam into said steam distilling zone and by circulating a heat carrying medium in indirect heat exchange with the liquid in said steam distilling zone.

KARL H. HACHMUTH.